United States Patent
Song

(10) Patent No.: US 9,129,558 B2
(45) Date of Patent: Sep. 8, 2015

(54) ORGANIC LIGHT EMITTING DISPLAY AND METHOD OF DRIVING THE SAME

(75) Inventor: June-Young Song, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 318 days.

(21) Appl. No.: 13/420,443

(22) Filed: Mar. 14, 2012

(65) Prior Publication Data

US 2012/0306858 A1    Dec. 6, 2012

(30) Foreign Application Priority Data

May 31, 2011   (KR) .................. 10-2011-0052059

(51) Int. Cl.
  G09G 5/00        (2006.01)
  G09G 3/32        (2006.01)
  G09G 3/00        (2006.01)
  H04N 13/04       (2006.01)

(52) U.S. Cl.
  CPC ............. *G09G 3/3225* (2013.01); *G09G 3/003* (2013.01); *G09G 2300/0861* (2013.01); *G09G 2310/04* (2013.01); *G09G 2310/061* (2013.01); *G09G 2310/063* (2013.01); *G09G 2310/08* (2013.01); *G09G 2320/0247* (2013.01); *G09G 2320/064* (2013.01); *G09G 2320/0633* (2013.01); *H04N 13/0438* (2013.01)

(58) Field of Classification Search
  CPC combination set(s) only.
  See application file for complete search history.

(56) References Cited

U.S. PATENT DOCUMENTS

| | | | |
|---|---|---|---|
| 6,392,620 B1 * | 5/2002 | Mizutani et al. ................. | 345/88 |
| 7,038,651 B2 * | 5/2006 | Nitta et al. ........................ | 345/98 |
| 2004/0113882 A1 * | 6/2004 | Baek, II ........................... | 345/99 |
| 2004/0130509 A1 * | 7/2004 | Yoon et al. ....................... | 345/63 |
| 2007/0165127 A1 * | 7/2007 | Minami .......................... | 348/308 |
| 2007/0200807 A1 * | 8/2007 | Lee et al. ......................... | 345/88 |
| 2007/0229447 A1 * | 10/2007 | Takahara et al. ............... | 345/102 |
| 2008/0007514 A1 * | 1/2008 | Tanaka ........................... | 345/102 |
| 2011/0018983 A1 * | 1/2011 | Kim et al. ....................... | 348/56 |
| 2011/0096146 A1 * | 4/2011 | Hulyalkar et al. .............. | 348/43 |
| 2011/0254932 A1 * | 10/2011 | Doung ............................ | 348/56 |
| 2012/0256908 A1 * | 10/2012 | Lee et al. ....................... | 345/419 |

FOREIGN PATENT DOCUMENTS

KR  10-2007-0094060 A   9/2007
KR  10-2008-0076316 A   8/2008

* cited by examiner

*Primary Examiner* — Linh N Hoffner
(74) *Attorney, Agent, or Firm* — Knobbe, Martens, Olson & Bear, LLP

(57) ABSTRACT

An organic light emitting display and method of driving the display are disclosed. The display is driven with an ith frame and an (i+1)th frame, wherein the (i+1)th frame has a shorter duration than the ith frame. The driving signals for the display are adjusted so that the apparent brightness of the frames is substantially equal.

18 Claims, 4 Drawing Sheets

ORGANIC LIGHT EMITTING DISPLAY AND METHOD OF DRIVING THE SAME

CROSS-REFERENCE TO RELATED APPLICATIONS

This application claims priority to and the benefit of Korean Patent Application No. 10-2011-0052059, filed on May 31, 2011, in the Korean Intellectual Property Office, the entire content of which is incorporated herein by reference.

BACKGROUND

1. Field

The disclosed technology relates to an organic light emitting display and a method of driving the same, and more particularly, to an organic light emitting display capable of displaying an image with uniform brightness and a method of driving the same.

2. Description of the Related Technology

Recently, various flat panel displays (FPDs) having reduced weight and volume as compared to cathode ray tubes (CRTs) have been developed. The FPDs include liquid crystal displays (LCDs), field emission displays (FEDs), plasma display panels (PDPs), and organic light emitting diode (OLED) displays.

Among the FPDs, the organic light emitting diode displays display images using OLEDs that generate light through the re-combination of electrons and holes. The organic light emitting diode displays have high response speed and are driven with low power consumption.

An organic light emitting diode display includes a plurality of data lines, scan lines, and pixels arranged at intersections of the scan and data lines. In most embodiments, each pixel includes an organic light emitting diode, at least two transistors including a drive transistor, and at least one capacitor.

A three dimensional (3D) organic light emitting diode display divides one frame period (e.g. about 16.6 ms) into two fields in order to realize a three dimensional (3D) image. In one frame period, a left image is displayed in a first field and a right image is displayed in a second field.

Shutter glasses receive light from a left lens in the first field and receive light from a right lens in the second frame. A viewer wearing the shutter glasses recognizes the image supplied through the shutter glasses in 3D. However, in a conventional art, due to a time difference between the first field and the second field, a uniform image may not be displayed.

In further detail, because a horizontal synchronizing signal Hsync and a vertical synchronizing signal Vsync are input from a system to a panel, additional hardware or circuitry for adjusting timing is to be included in the panel to manage the synchronizing signals. Accordingly, manufacturing cost increases. Therefore, a method in which a data enable (hereinafter, referred to as DE) signal and data are input from the system to the panel so that the hardware is omitted and the panel generates the horizontal synchronizing signal Hsync and the vertical synchronizing signal Vsync while counting the DE signals is used.

The DE signals generated based on data of one line have the same input period as the horizontal synchronizing signal Hsync. Therefore, the horizontal synchronizing signal Hsync may be generated by counting the DE signals. In addition, the vertical synchronizing signal Hsync may be generated based on a number of DE count signals.

If the DE signals and the data are supplied by the system, as illustrated in FIG. 1, a time difference is generated between odd frames and even frames. For example, in the case of the panel having 1,080 valid lines, the 1,080 DE signals are input to the respective frames. Accordingly, 1,080 count signals are generated by the respective frames (ith and (i+1)th frames).

The timing controller additionally generates counting signals based on the periods of the DE signals in a blank period after 1,080. In this case, 1,200 counting signals are generated in an ith (i is an odd number or an even number) frame and 1,110 counting signals are generated in an (i+1)th frame. In this example, the ith frame has a duration of 16.8 ms and the (i+1)th frame has a duration of 16.4 ms.

In such a panel, when a frame is divided into two fields in order to display a 3D image, the first field and the second field included in the (i+1)th frame and the first field included in the ith frame has a duration of 8.2 ms and the second field included in the ith frame has a duration of 8.6 ms. Therefore, the second field emission time of the ith frame is set to be longer than the emission times of adjacent fields so that an image with non-uniform brightness (for example, a flicker phenomenon) is displayed.

SUMMARY OF CERTAIN INVENTIVE ASPECTS

One inventive aspect is a method of driving an organic light emitting display having an ith frame and an (i+1)th frame, where the (i+1)th frame has a shorter duration than the ith frame. The method includes dividing each of the ith frame and the (i+1)th frame into a first field and a second field, and displaying black in a partial period of the second field of the ith frame.

Another inventive aspect is a method of driving an organic light emitting display configured to display images during an ith frame and during an (i+1)th frame, where the duration of the (i+1)th frame is shorter than the duration of the ith frame. The method includes dividing each of the ith frame and the (i+1)th frame into a first field and a second field, supplying a first power of a first voltage to pixels in the first field of the ith frame and in the first and second fields of the (i+1)th frame, and supplying the first power source of a second voltage to the pixels in the second field of the ith frame, where the first and second voltages are different.

Another inventive aspect is an organic light emitting display configured to display images during an ith frame including a first field and a second field, where the duration of the second field is longer than duration of the first field and an (i+1)th frame including first and second fields each having a duration substantially equal to the duration of the first field of the ith frame. The organic light emitting display includes a scan driver for supplying scan signals to scan lines, a data driver for supplying data signals to data lines, and a plurality of pixels positioned at intersections of the scan lines and the data lines configured to control an amount of current that flows from a first power source to a second power source via OLEDs according to data signals. The display also includes a power source unit for supplying the first power source and the second power source, and a timing controller for controlling the scan driver, the data driver, and the power source unit. The timing controller includes a converter for converting data input from an outside into data of a 3D format, a counter for counting data enable (DE) signals input from the outside, a signal generator for supplying period signals having the same period as the DE signals to the counter when the DE signals are not input, and a controller for controlling the power source unit to correspond to the counting signals from the counter.

BRIEF DESCRIPTION OF THE DRAWINGS

The accompanying drawings, together with the specification, illustrate exemplary embodiments, and, together with the description, serve to explain various principles and aspects.

DETAILED DESCRIPTION OF CERTAIN INVENTIVE EMBODIMENTS

Figure 1:
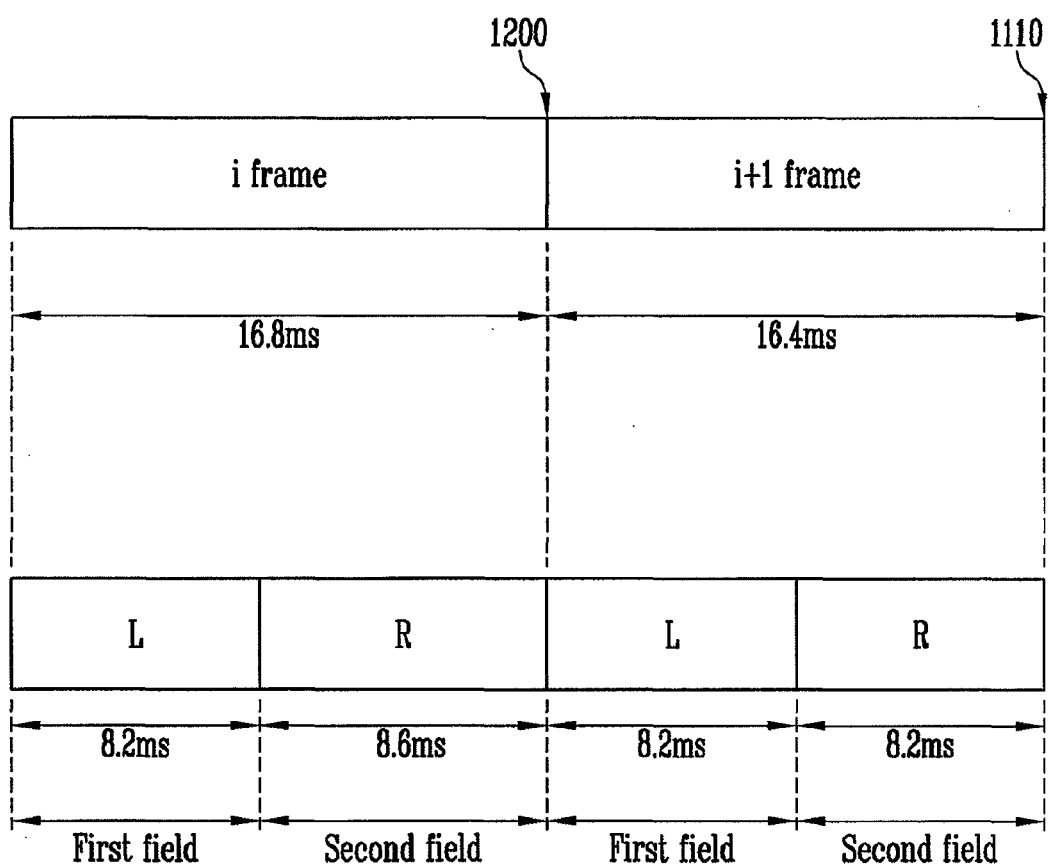
FIG. 1 is a timing view illustrating the frame periods of a system using data enable (DE) signals.

Hereinafter, certain exemplary embodiments are described with reference to the accompanying drawings. When a first element is described as being coupled to a second element, the first element may be either directly coupled to the second element or may be indirectly coupled to the second element via a third element. Further, some of the elements that are not essential to the complete understanding of the invention are omitted for clarity. Also, like reference numerals generally refer to like elements throughout.

Figure 2:
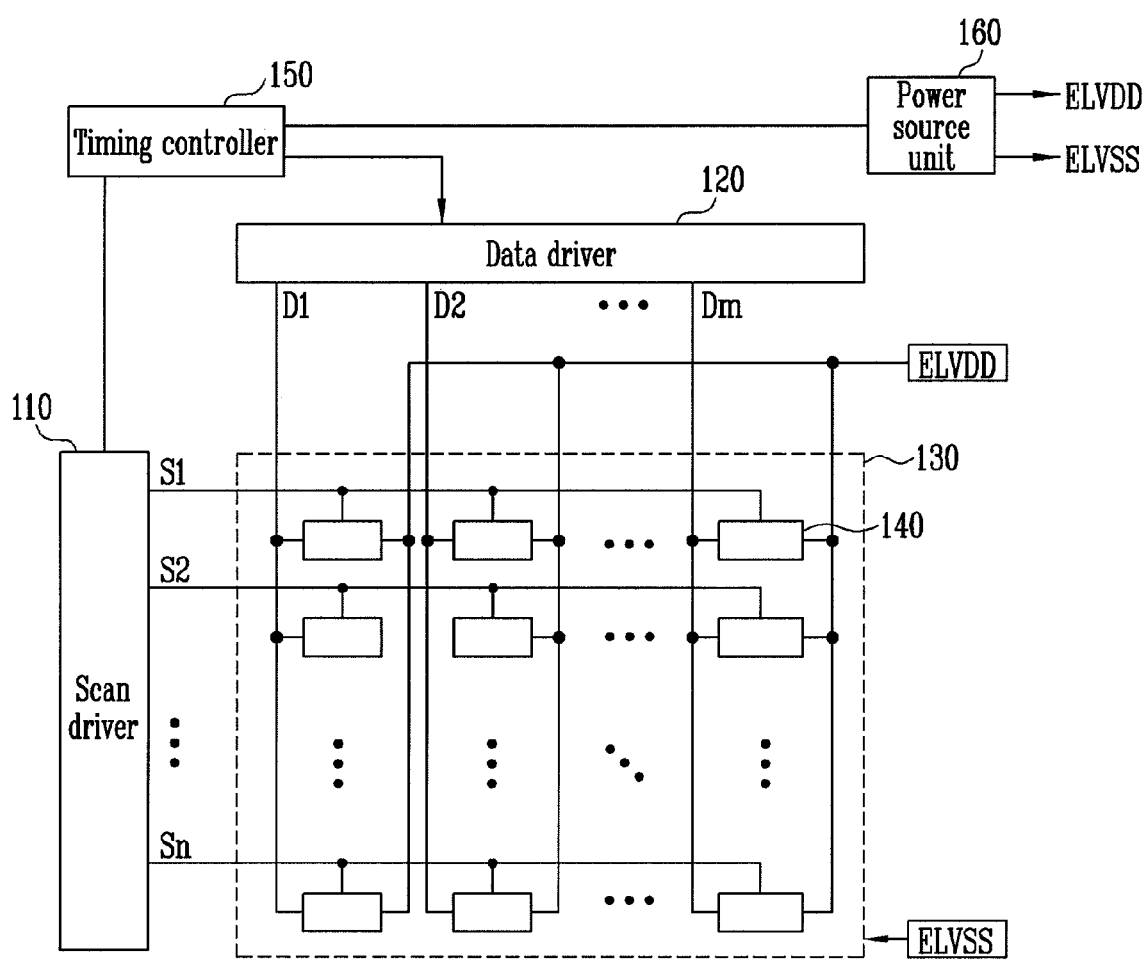
FIG. 2 is a block diagram illustrating an organic light emitting display according to an embodiment of the present invention.

FIG. 2 is a block diagram illustrating an organic light emitting display according to an embodiment of the present invention. Referring to FIG. 2, the organic light emitting display includes a pixel unit 130 including pixels 140 positioned at the intersections of scan lines S1 to Sn and data lines D1 to Dm, a scan driver 110 for driving the scan lines S1 to Sn, a scan driver 110 for driving the scan lines 51 to Sn, a data driver 120 for driving the data lines D1 to Dm, a power source unit 160 for generating a first power ELVDD and a second power ELVSS supplied to the pixels 140, and a timing controller 150 for controlling the scan driver 110, the data driver 120, and the power source unit 160.

The pixels 140 receive the first power ELVDD and the second power ELVSS. The pixels 140 generate light with a desired brightness according to the amount of current that flows from the source of the first power ELVDD to the source of the second power ELVSS via organic light emitting diodes (OLED) based on data signals.

The power source unit 160 generates the first power ELVDD and the second power ELVSS to supply the generated first and second power ELVDD and ELVSS to the pixels 140. The power source unit 160 controls the voltage of the power ELVDD and/or the second power ELVSS so that the pixels 140 are in a non-emission state in the partial period of the ith frame under the control of the timing controller 150.

The scan driver 110 supplies scan signals to the scan lines S1 to Sn. When the scan signals are supplied to the scan lines S1 to Sn, the pixels 140 are selected in units of lines.

The data driver 120 supplies the data signals to the data lines D1 to Dm in synchronization with the scan signals. The data signals supplied to the data lines D1 to Dm are input to the pixels 140 selected by the scan signals.

The timing controller 150 controls the scan driver 110 and the data driver 120 using a horizontal synchronizing signal and a vertical synchronizing signal generated therein. In addition, the timing controller 150 controls the power source unit 160 so that the pixels 140 are set to be in the non-emission state in the partial period of the ith frame.

Figure 3:
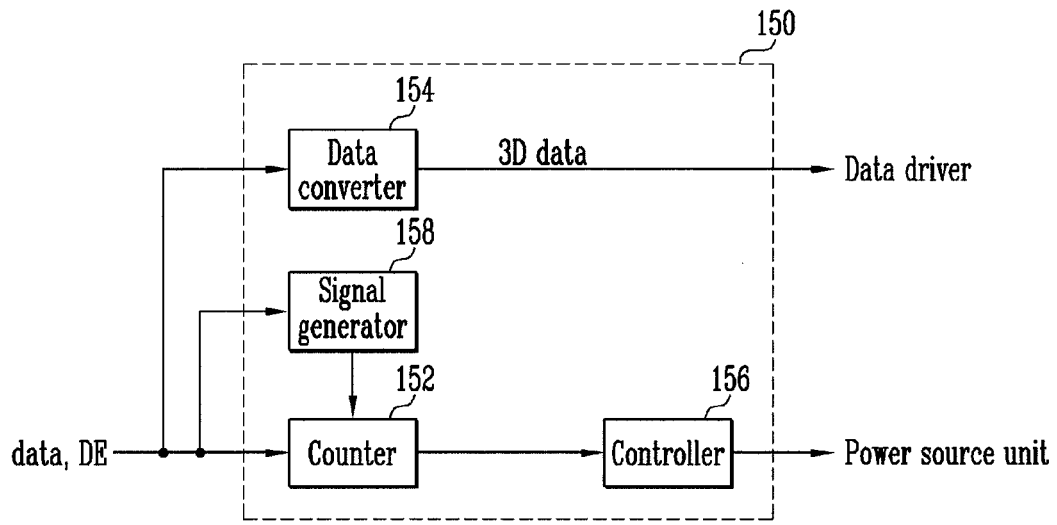
FIG. 3 is a block diagram illustrating an embodiment of the timing controller of FIG. 2.

FIG. 3 is a block diagram illustrating an embodiment of the timing controller of FIG. 2. In FIG. 3, for convenience sake, a structure for controlling the power source unit 160 is mainly illustrated. However, the present invention is not limited to this embodiment. For example, a control signal generator (not shown) for generating control signals and a data controller (not shown) for controlling two dimensional data may be further included in the timing controller 150.

Referring to FIG. 3, the timing controller 150 includes a counter 152, a data converter 154, a controller 156, and a signal generator 158.

Figure 4:
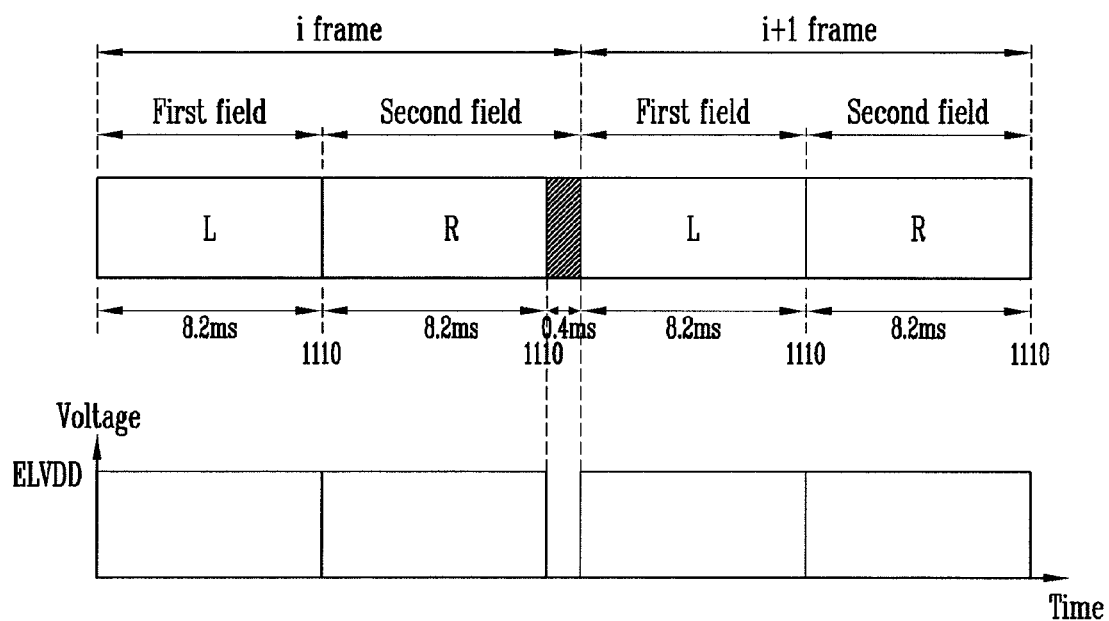
FIG. 4 is a timing view illustrating the frame periods controlled by the timing controller of FIG. 3.

The data converter 154 converts data input from the outside into a 3D data format. For example, the data converter 154 may re-arrange the data as left (L) and right (R) data in the respective fields as illustrated in FIG. 4 to supply the re-arranged data to the data driver 120. The counter 152 generates counting signals while counting data enable (DE) signals or period signals supplied by the signal generator 158.

The signal generator 158 supplies the period signals having the same period as the DE signals to the counter 152 if the DE signals are not input. In this case, the counter 152 may continuously generate the counting signals regardless of the input of the DE signals.

The controller 156 supplies a first control signal to the power source unit 160 when the counting signals of greater than or equal to a reference value are input and supplies a second control signal to the power source unit 160 when the counting signals of less than the reference value are input. The reference value is determined so that the second control signal is generated in the first field of an ith frame and the first and second fields of an (i+1)th frame that are set as the same period and that the first control signal is generated in the partial period of the second field of the ith frame as illustrated in FIG. 4. In this embodiment, the partial period means the remaining period (0.4 ms) excluding the same period (8.2 ms) as the first field period of the ith frame in the second field period (8.6 ms) of the ith frame.

In embodiments according to FIGS. 3 and 4, the data and the DE signals are input from the outside. The data converter 154 converts the data into the 3D data format to supply the 3D data format to the data driver 120.

The counter 152 supplies the counting signals that sequentially increase to correspond to the DE signals to the controller 156. For example, when the 1,080 DE signals are input, the counter 152 inputs the counting signals that increase from 1 to 1,080 to the controller 156.

The signal generator 158 supplies the period signals having the same input period as the DE signals to the counter 152 when the DE signals are not input. Then, the counter 152 supplies the counting signals that increase in the order of 1,081 and 1,082 to the controller 156 to correspond to the period signals.

The controller 156 generates the second control signal when the count signals of less than a reference value (for example, 1,101) are input to supply the generated second control signal to the power source unit 160. The controller 156 generates the first control signal when the count signals of greater than or equal to the reference value are input to supply the generated first control signal to the power source unit 160.

When the second control signal is input, the power source unit 160 normally generates the first power source ELVDD and the second power source ELVSS to supply the generated first and second power sources ELVDD and ELVSS to the pixels 140. When the first control signal is input, the power source unit 160 controls (for example, supplies a low voltage to) the first power source ELVDD to set the pixels 140 to be in the non-emission state.

In this case, in the partial period of the second field included in the ith frame, the pixels 140 are set to be in a non-emission state. Therefore, according to this embodiment, in the entire field periods included in the ith frame and the (i+1)th frame, light components with the same duration may be generated so that an image with uniform brightness may be displayed.

As shown in FIG. 4, the first power source ELVDD is controlled by the power source unit 160 when the first control signal is input. However, the present invention is not limited to the above. For example, the power source unit 160 may control (for example, supply a high voltage to) the source of the second power ELVSS when the first control signal is input so that the pixels 140 are set to be in the non-emission state.

Figure 5:
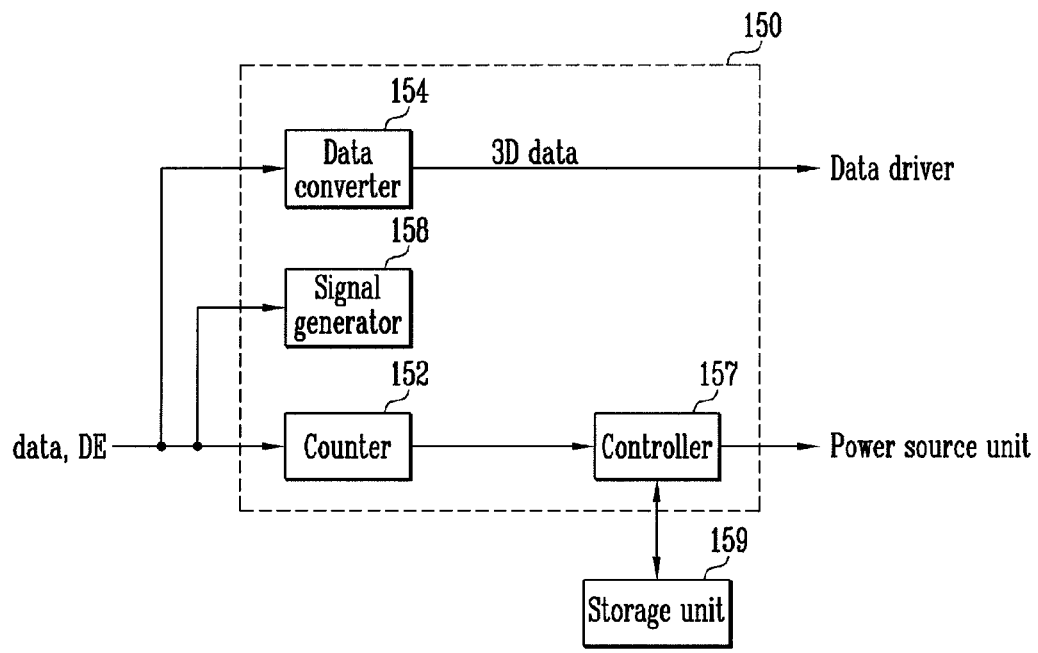
FIG. 5 is a block diagram illustrating another embodiment of the timing controller of FIG. 2.

FIG. 5 is a view illustrating another embodiment of the timing controller of FIG. 2. In FIG. 5, the same elements as those of FIG. 3 are denoted by the same reference numerals and detailed description thereof will be omitted.

Referring to FIG. 5, the timing controller 150 according to another embodiment includes counter 152, data converter 154, a controller 157, signal generator 158, and a storage unit 159.

Figure 6:
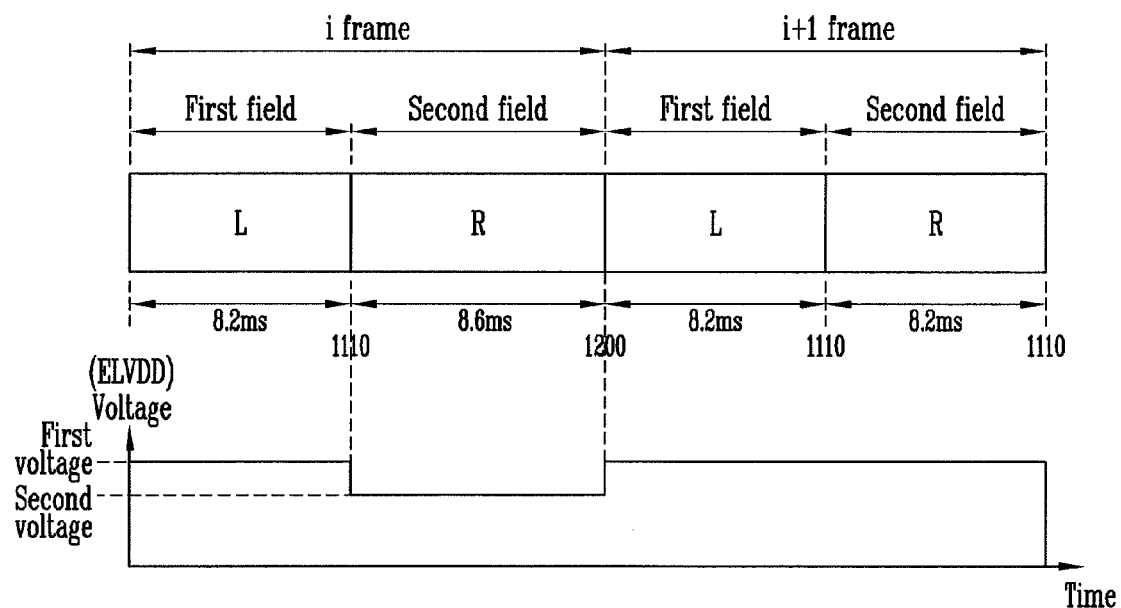
FIG. 6 is a timing view illustrating the frame periods controlled by the timing controller of FIG. 5.

The controller 157 receives counting signals and stores the final counting signal in the storage unit 159. As illustrated in FIG. 6, the counting signals of 1,110, 1,200, 1,110, 1,110, 1,110, 1,200 . . . are sequentially stored in the storage unit 159.

The controller 157 determines whether the current field is the second field of an ith frame or another field using the stored counting signals stored in the storage unit 159. The final counting signal stored in the storage unit 159 may have a uniform rule. For example, the controller 157 may determine that the next field is the second field of the ith frame when 1,110 is stored in the storage unit 159 three times or three consecutive times. The controller 157 generates a first control signal to supply the generated first control signal to the power source unit 160 when it is determined that the current field is the second field of the ith frame and generates a second control signal to supply the generated second control signal to the power source unit 160 when it is determined that the current field is another field.

The power source unit 160 supplies the first power ELVDD having a second voltage when the first control signal is input and supplies the first power ELVDD having a first voltage higher than the second voltage when the second control signal is input. The second voltage supplied to the second field of the ith frame is set so that the apparent brightness of the second field of the ith frame is equal to apparent brightness of the other fields that receive the first voltage. Then, light components with similar apparent brightness are generated in all of the field periods so that an image with uniform brightness may be displayed.

While the present invention has been described in connection with certain exemplary embodiments, it is to be understood that the invention is not limited to the disclosed embodiments, but, on the contrary, is intended to cover various modifications and equivalent arrangements.

What is claimed is:

1. A method of driving an organic light emitting display comprising a plurality of pixels configured to display images during an ith frame and an (i+1)th frame, wherein the (i+1)th frame has a shorter duration than the ith frame, the method comprising:
dividing each of the ith frame and the (i+1)th frame into a first field and a second field; and
displaying black in all of the pixels of the display in a partial time period of the second field of the ith frame, wherein the duration of the first field of the ith frame and the first and second fields of the (i+1) th frame are substantially equal, and
wherein the partial time period has a duration equal to the difference in the duration between the first field of the ith frame and the second field of the ith frame.

2. The method as claimed in claim 1, wherein the partial time period is adjacent to the (i+1)th frame.

3. The method as claimed in claim 1, further comprising controlling an amount of current that flows from a first power source to a second power source via organic light emitting diodes (OLEDs) and controlling a voltage of the first power source so that current does not flow to the OLEDs in the partial time period.

4. The method as claimed in claim 1, further comprising controlling an amount of current that flows from a first power source to a second power source via organic light emitting diodes (OLEDs) and controlling the voltage of the second power source so that current does not flow to the OLEDs in the partial time period.

5. The method as claimed in claim 1, wherein left data is supplied in the first field period and right data is supplied in the second field period in order to display a three dimensional (3D) image.

6. A method of driving an organic light emitting display comprising a plurality of pixels configured to display images during an ith frame and during an (i+1)th frame, wherein the duration of the (i+1)th frame is shorter than the duration of the ith frame, the method comprising:
dividing each of the ith frame and the (i+1)th frame into a first field and a second field; and
supplying a first power source of a first voltage to the pixels in the first field of the ith frame and in the first and second fields of the (i+1)th frame and supplying the first power source of a second voltage to the pixels in the second field of the ith frame, wherein the first and second voltages are different.

7. The method as claimed in claim 6, wherein the first field of the ith frame, the first field of the (i+1)th frame, and the second field of the (i+1)th frame have substantially equal durations.

8. The method as claimed in claim 6, wherein the second voltage is lower than the first voltage and wherein the first and second voltages are configured to drive the pixels.

9. The method as claimed in claim 6, further comprising controlling an amount of current that flows from the first power source to a second power source via OLEDs to generate light.

10. The method as claimed in claim 6, wherein left data is supplied in the first field and right data is supplied in the second field in order to display a 3D image.

11. An organic light emitting display configured to display images during an ith frame including a first field and a second field, wherein the duration of the second field is longer than duration of the first field and an (i+1)th frame including first and second fields each having a duration substantially equal to the duration of the first field of the ith frame, the organic light emitting display comprising:
a scan driver for supplying scan signals to scan lines;
a data driver for supplying data signals to data lines;
a plurality of pixels positioned at intersections of the scan lines and the data lines configured to control an amount of current that flows from a first power source to a second power source via OLEDs according to data signals;
a power source unit for supplying the first power source and the second power source; and
a timing controller for controlling the scan driver, the data driver, and the power source unit, wherein the timing controller comprises:
- a converter for converting data input from an outside into data of a 3D format;
- a counter for counting data enable (DE) signals input from the outside;
- a signal generator for supplying period signals having the same period as the DE signals to the counter when the DE signals are not input; and
- a controller for controlling the power source unit to correspond to the counting signals from the counter.

12. The organic light emitting display as claimed in claim 11, wherein the controller controls the power source unit so that the pixels are set to be in a non-emission state in a partial period of the second field of the ith frame.

13. The organic light emitting display as claimed in claim 12, wherein the power source unit controls a voltage of at least one of the first power source and the second power source to set the pixels to be in a non-emission state.

14. The organic light emitting display as claimed in claim 12, wherein the partial period has a duration equal to the difference in the durations of the first and second fields.

15. The organic light emitting display as claimed in claim 12, wherein the partial period is adjacent to the (i+1)th frame.

16. The organic light emitting display as claimed in claim 11, further comprising a storage unit coupled to the controller to store count signals input to the counter.

17. The organic light emitting display as claimed in claim 16, wherein the controller determines fields of the ith frame and the (i+1)th frame using the final count signal stored in the storage unit.

18. The organic light emitting display as claimed in claim 17, wherein the controller controls the power source unit so that the first power source of a second voltage is supplied in the second field of the ith frame and that the first power source of a first voltage higher than the second voltage is supplied in the first field of the ith frame and in the first and second fields of the second frame.

* * * * *